(12) United States Patent
Ohmae et al.

(10) Patent No.: US 11,940,066 B2
(45) Date of Patent: Mar. 26, 2024

(54) FLOW PASSAGE JOINT STRUCTURE

(71) Applicant: NIPPON PILLAR PACKING CO., LTD., Osaka (JP)

(72) Inventors: Kiyotaka Ohmae, Osaka (JP); Masashi Katanaya, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 500 days.

(21) Appl. No.: 17/272,111

(22) PCT Filed: Jun. 12, 2019

(86) PCT No.: PCT/JP2019/023293
§ 371 (c)(1),
(2) Date: Feb. 26, 2021

(87) PCT Pub. No.: WO2020/044727
PCT Pub. Date: Mar. 5, 2020

(65) Prior Publication Data
US 2021/0317932 A1   Oct. 14, 2021

(30) Foreign Application Priority Data

Aug. 30, 2018 (JP) .................................. 2018-161495
Oct. 12, 2018 (JP) .................................. 2018-193580

(51) Int. Cl.
*F16L 19/02* (2006.01)
*F16L 15/04* (2006.01)
*F16L 17/06* (2006.01)

(52) U.S. Cl.
CPC ........... *F16L 19/0212* (2013.01); *F16L 15/04* (2013.01); *F16L 17/06* (2013.01)

(58) Field of Classification Search
CPC ....... F16L 19/0212; F16L 17/06; F16L 19/02; F16L 19/05; F16L 19/041; F16L 47/16; F16L 2201/10; F16L 2201/60
See application file for complete search history.

(56) References Cited

U.S. PATENT DOCUMENTS 279,086 A * 6/1883 Emery .................... F16L 47/04
3,476,409 A * 11/1969 Schmidt
(Continued)

FOREIGN PATENT DOCUMENTS

JP   S59144088 U1   9/1984
JP   2004-244062 A   9/2004
(Continued)

OTHER PUBLICATIONS

International Search Report dated Aug. 20, 2019 for PCT Application PCT/JP2019/023293.
(Continued)

Primary Examiner — William S. Choi
(74) Attorney, Agent, or Firm — Millen, White, Zelano & Branigan P.C.; William F. Nixon

(57) ABSTRACT

A flow passage joint structure includes: a first external thread portion formed, at an end portion of first piping block, radially outward of flow passage hole; a second external thread portion formed, at an end portion of second piping block, radially outward of flow passage hole; a union nut having a first internal thread portion to be screwed to the first external thread portion, on one side in an axial direction thereof, and having a second internal thread portion to be screwed to the second external thread portion, on another side in the axial direction thereof; and a gasket configured to seal a connection portion between the flow passage holes on a radially inner side of the union nut. The first external thread portion and the first internal thread portion are
(Continued)

right-hand threads, and the second external thread portion and the second internal thread portion are left-hand threads.

10 Claims, 13 Drawing Sheets

(56) References Cited

U.S. PATENT DOCUMENTS

| | | | |
|---|---|---|---|
| 5,350,205 A * | 9/1994 | Aldridge | ............... F16L 19/02 |
| 6,070,912 A | 6/2000 | Latham et al. | |
| 6,578,876 B2 | 6/2003 | Guertin, Jr. et al. | |
| 9,539,449 B2 * | 1/2017 | Richardson | |
| 2002/0070547 A1 * | 6/2002 | Guertin, Jr. | |
| 2003/0122373 A1 | 7/2003 | Eugene et al. | |
| 2008/0073910 A1 | 3/2008 | Scott et al. | |
| 2009/0261573 A1 | 10/2009 | Nakata | |
| 2010/0013213 A1 | 1/2010 | Katsura et al. | |
| 2014/0035272 A1 | 2/2014 | Wall et al. | |
| 2016/0116096 A1 | 4/2016 | Fujii et al. | |

FOREIGN PATENT DOCUMENTS

| | | |
|---|---|---|
| JP | 2006-308051 A | 11/2006 |
| JP | 2014-219060 A | 11/2014 |
| TW | 200706235 A | 2/2007 |
| TW | 200726936 A | 7/2007 |

OTHER PUBLICATIONS

English Translation of JP2004-244062, Publication Date: Sep. 2, 2004.

English Translation of JPS59144088, Publication Date: Sep. 26, 1984.

* cited by examiner

FLOW PASSAGE JOINT STRUCTURE

TECHNICAL FIELD

The present invention relates to a flow passage joint structure.

BACKGROUND ART

In a piping path for fluids such as chemical solutions that are handled in manufacturing processes in various technical fields such as semiconductors, liquid crystal devices, and organic EL devices, a flow passage joint structure shown in FIG. 13 is known as a flow passage joint structure that connects, at the shortest distance, flow passage holes formed in two fluid devices such as pumps, valves, accumulators, filters, flow meters, pressure sensors, and piping blocks. This flow passage joint structure is configured to connect fluid devices 110 to both ends of a tube 101 formed with the minimum necessary length, by using sleeves 102 and union nuts 103 (see PATENT LITERATURE 1).

CITATION LIST

Patent Literature

PATENT LITERATURE 1: Japanese Laid-Open Patent Publication No. 2014-SUMMARY OF INVENTION

Technical Problem

In manufacturing processes for semiconductors, liquid crystal devices, organic EL devices, and the like, a flow passage joint structure used when sending and circulating a chemical solution is preferably installed in a small space. However, the flow passage joint structure shown in FIG. 13 requires an installation space for installing the tube 101 and the two union nuts 103, so that there is a problem that the flow passage joint structure cannot be installed in a small space.

The present invention has been made in view of such circumstances, and an object of the present invention is to allow a flow passage joint structure to be installed in a small space.

Solution to Problem (1) A flow passage joint structure according to the present invention is a flow passage joint structure for connecting flow passage holes formed in two fluid devices, respectively, to each other, the flow passage joint structure including: a first external thread portion formed, at an end portion of one fluid device of the two fluid devices, radially outward of the flow passage hole of the one fluid device; a second external thread portion formed, at an end portion of the other fluid device of the two fluid devices, radially outward of the flow passage hole of the other fluid device; a union nut having a first internal thread portion to be screwed to the first external thread portion, on one side in an axial direction thereof, and having a second internal thread portion to be screwed to the second external thread portion, on another side in the axial direction thereof; and a sealing member configured to seal a connection portion between the flow passage holes in the two fluid devices on a radially inner side of the union nut when the first internal thread portion is screwed to the first external thread portion and the second internal thread portion is screwed to the second external thread portion, wherein each of the first external thread portion and the first internal thread portion is one of a right-hand thread and a left-hand thread, and each of the second external thread portion and the second internal thread portion is the other of the right-hand thread and the left-hand thread.

According to the present invention, the first internal thread portion on the one side in the axial direction of the union nut is one of the right-hand thread and the left-hand thread, and the second internal thread portion on the other side in the axial direction of the union nut is the other of the right-hand thread and the left-hand thread. Thus, by tightening the union nut, the first internal thread portion is screwed to the first external thread portion of the one fluid device, and the second internal thread portion is screwed to the second external thread portion of the other fluid device. Accordingly, the flow passage holes of the two fluid devices can be connected to each other only by the one union nut, and the connection portion between the flow passage holes can be sealed by a gasket on the radially inner side of the union nut. Therefore, for the flow passage joint structure according to the present invention, it is not necessary to install a tube and two union nuts as in a conventional structure, and thus the flow passage joint structure can be installed in a small space.

(2) Preferably, a thread start position of the first external thread portion and a thread start position of the second external thread portion are set at the same position in a circumferential direction, and a thread start position of the first internal thread portion and a thread start position of the second internal thread portion are set at the same position in the circumferential direction.

In this case, when tightening the union nut, the timing when screwing of the first internal thread portion to the first external thread portion is started and the timing when screwing of the second internal thread portion to the second external thread portion is started can be caused to coincide with each other. Accordingly, tightening of the first internal thread portion to the first external thread portion and tightening of the second internal thread portion to the second external thread portion can be easily managed.

(3) Preferably, the flow passage joint structure further includes: a first mark portion provided to the one fluid device and indicating the thread start position of the first external thread portion; a second mark portion provided to the other fluid device and indicating the thread start position of the second external thread portion; and a third mark portion provided to the union nut and indicating a thread start position of at least one of the first internal thread portion and the second internal thread portion.

In this case, by aligning the first mark portion and the second mark portion of the two fluid devices with the third mark portion of the union nut, the thread start position of the first external thread portion and the thread start position of the first internal thread portion can be easily aligned with each other, and the thread start position of the second external thread portion and the thread start position of the second internal thread portion can be easily aligned with each other.

(4) Preferably, one of the position indicated by each of the first mark portion and the second mark portion and the position indicated by the third mark portion is an actual thread start position, and the other of the position indicated by each of the first mark portion and the second mark portion and the position indicated by the third mark portion is a position shifted from an actual thread start position in the circumferential direction.

In this case, when the first mark portion and the second mark portion of the two fluid devices are aligned with the third mark portion of the union nut, the actual thread start position of the first external thread portion and the actual thread start position of the first internal thread portion are shifted from each other in the circumferential direction, and the actual thread start position of the second external thread portion and the actual thread start position of the second internal thread portion are shifted from each other in the circumferential direction. Accordingly, when the union nut is tightened from the state where the above alignment has been performed, the first internal thread portion can be smoothly screwed to the first external thread portion, and the second internal thread portion can be smoothly screwed to the second external thread portion.

(5) Preferably, the union nut further has a non-threaded portion formed between the first external thread portion and the second external thread portion.

In the case where the first external thread portion and the second external thread portion of the union nut are formed continuously in the axial direction, when tightening the union nut, for example, if the timing when screwing of the second internal thread portion to the second external thread portion is started is delayed from the timing when screwing of the first internal thread portion to the first external thread portion is started, the following problem arises. Specifically, even after tightening of the first internal thread portion to the first external thread portion is completed, the union nut is tightened until tightening of the second internal thread portion to the second external thread portion is completed. Accordingly, the first external thread portion moves to the screwing position of the second internal thread portion, but the first external thread portion and the second internal thread portion are a right-hand thread and a left-hand thread, respectively, and thus cannot be screwed to each other. Therefore, when the union nut is forcibly tightened, the first external thread portion and the second internal thread portion may be damaged.

On the other hand, in the case of the flow passage joint structure of the above (5), for example, even when the first external thread portion moves toward the second internal thread portion as described above, the first external thread portion moves to a position corresponding to the non-threaded portion, so that the first external thread portion can be inhibited from moving to the screwing position of the second internal thread portion. Therefore, when tightening the union nut, even if the timing when screwing of the first internal thread portion to the first external thread portion is started and the timing when screwing of the second internal thread portion to the second external thread portion is started become different from each other, the first external thread portion can be inhibited from moving to the screwing position of the second internal thread portion, and the second external thread portion can be inhibited from moving to the screwing position of the first internal thread portion. As a result, the external thread portion on the fluid device side and the internal thread portion on the union nut side can be effectively inhibited from being damaged.

(6) Preferably, at least one of the two fluid devices has a contact portion with which the union nut comes into contact when retightening of the union nut reaches a limit thereof.

In this case, since the union nut comes into contact with the contact portion of the fluid device when retightening of the union nut reaches the limit thereof, the operator can easily grasp that retightening of the union nut has reached the limit thereof, by a torque change due to the contact.

(7) Preferably, the flow passage joint structure further includes a flow direction mark portion provided to the union nut and indicating a flow direction of a fluid flowing in the union nut.

In this case, the operator can easily grasp the orientation of the union nut disposed between the two fluid devices, by the flow direction mark portion.

(8) Preferably, the flow passage joint structure further includes a tightening direction mark portion provided to the union nut and indicating a tightening direction of the union nut.

In this case, the operator can easily grasp the tightening direction of the union nut by the tightening direction mark portion.

Advantageous Effects of Invention

According to the present invention, it is possible to install the flow passage joint structure in a small space.

DESCRIPTION OF EMBODIMENTS

[Flow Passage Joint Structure]

Next, preferred embodiments of the present invention will be described with reference to the accompanying drawings. At least some parts of a plurality of embodiments described below may be combined together as desired.

Figure 1:
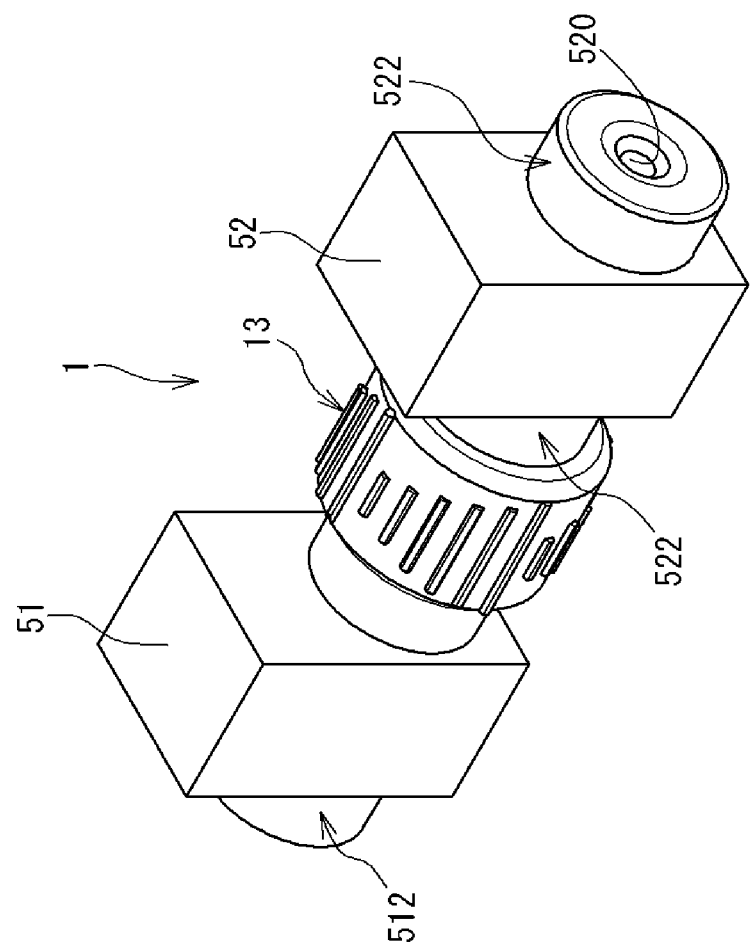
FIG. 1 is a perspective view showing a flow passage joint structure according to a first embodiment of the present invention.

FIG. 1 is a perspective view showing a flow passage joint structure according to a first embodiment of the present invention. In FIG. 1, a flow passage joint structure 1 according to the present embodiment is used, for example, as a connection structure that connects a flow passage hole 510 (see FIG. 4) formed in a first piping block (fluid device) 51 and a flow passage hole 520 formed in a second piping block (fluid device) 52, in a piping path through which a chemical solution used in a semiconductor manufacturing apparatus flows.

The flow passage joint structure 1 according to the present embodiment is used as the connection structure that connects the flow passage holes 510 and 520 of the piping blocks 51 and 52, but can also be applied to a connection structure that connects flow passage holes of other fluid devices such as pumps, valves, accumulators, and filters.

Figure 2:
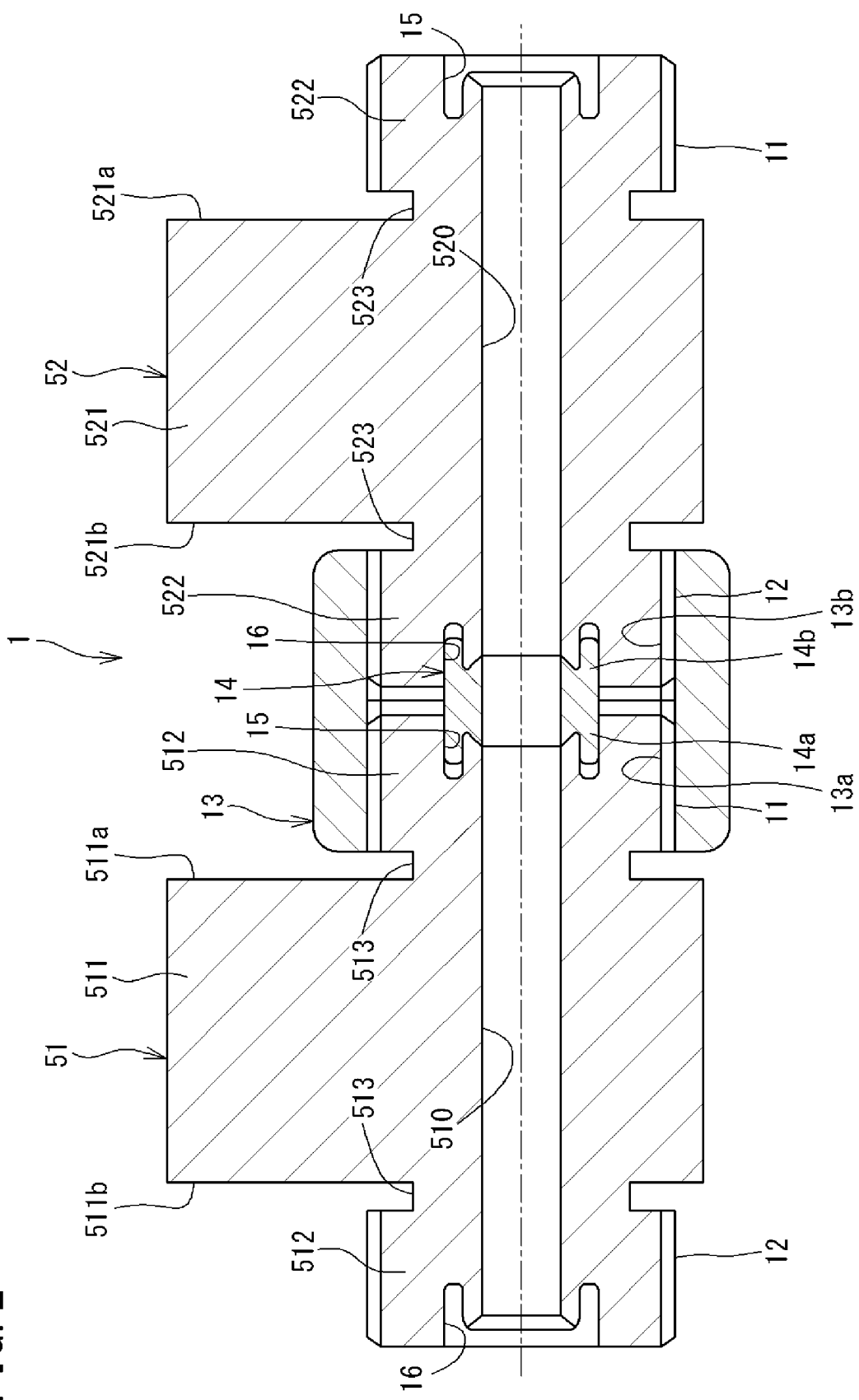
FIG. 2 is a cross-sectional view of the flow passage joint structure.
Figure 3:
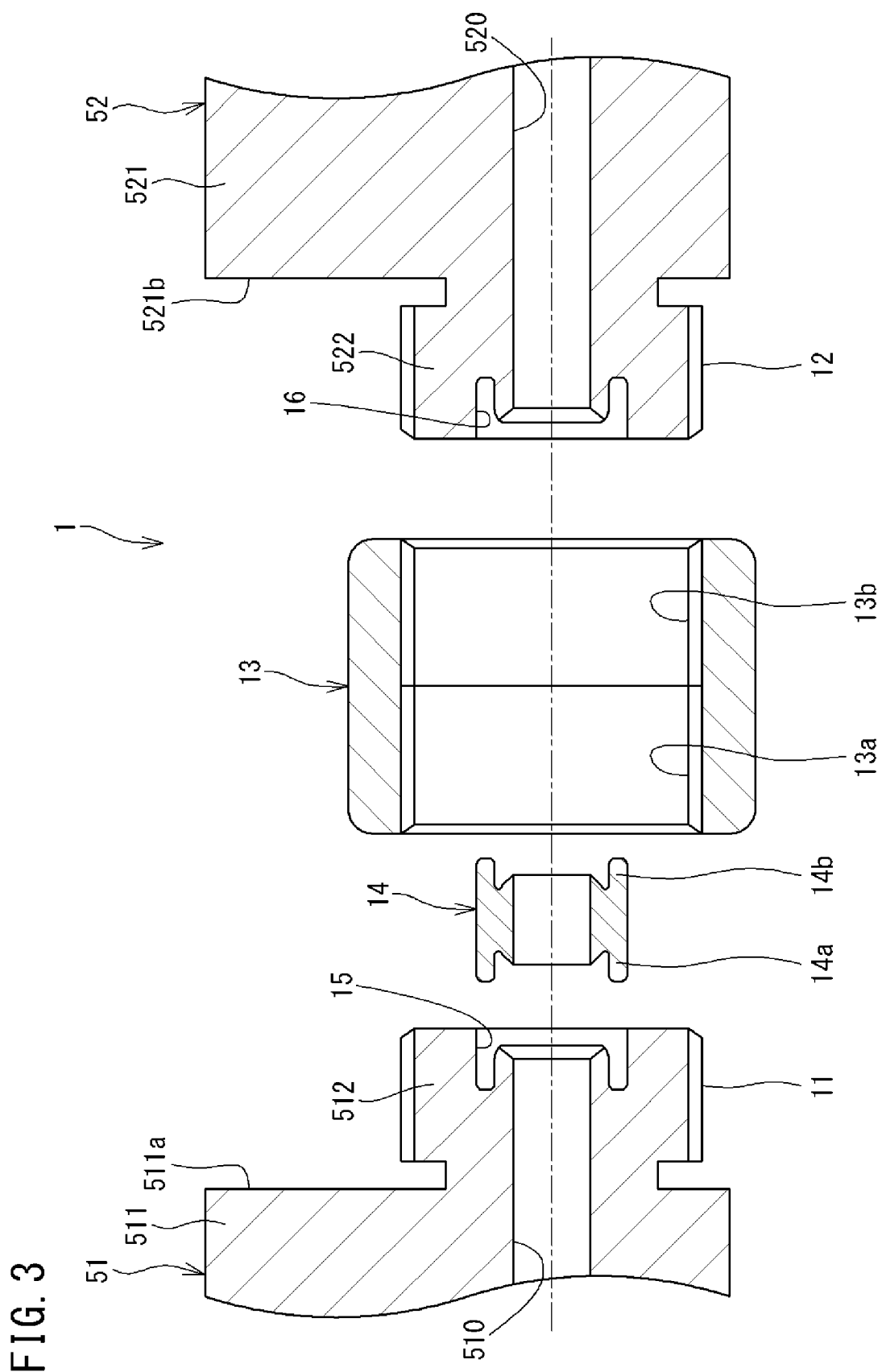
FIG. 3 is a cross-sectional view showing a state where the flow passage joint structure is disassembled.

FIG. 2 is a cross-sectional view of the flow passage joint structure 1 according to the present embodiment. FIG. 3 is a cross-sectional view showing a state where the flow passage joint structure 1 is disassembled. In FIG. 2 and FIG. 3, the first piping block 51 includes a block body 511 composed of, for example, a rectangular body, and a pair of first projection portions 512 formed on one end surface 511a of the block body 511 and another end surface 511b on its opposite side so as to project therefrom. An annular groove 513 is formed on a proximal end portion on the block body 511 side of each first projection portion 512.

A first external thread portion 11 composed of an external thread is formed on the outer periphery of one first projection portion 512 (on the right side in FIG. 2) except for the annular groove 513. A second external thread portion 12 composed of an external thread is formed on the outer periphery of the other first projection portion 512 (on the left side in FIG. 2) except for the annular groove 513. The flow passage hole 510 of the first piping block 51 is formed so as to penetrate the block body 511 and the pair of first projection portions 512. Therefore, the first external thread portion 11 and the second external thread portion 12 are formed radially outward of both end portions of the flow passage hole 510, respectively.

An annular first sealing groove 15 is formed on the distal end surface of the one first projection portion 512, and an annular second sealing groove 16 is formed on the distal end surface of the other first projection portion 512.

The second piping block 52 includes a block body 521 composed of, for example, a rectangular body, and a pair of second projection portions 522 formed on one end surface 521a of the block body 521 and another end surface 521b on its opposite side so as to project therefrom. An annular groove 523 is formed on a proximal end portion on the block body 521 side of each second projection portion 522.

A first external thread portion 11 is formed on the outer periphery of one second projection portion 522 (on the right side in FIG. 2) except for the annular groove 523. A second external thread portion 12 is formed on the outer periphery of the other second projection portion 522 (on the left side in FIG. 2) except for the annular groove 523. The flow passage hole 520 of the second piping block 52 is formed so as to penetrate the block body 521 and the pair of second projection portions 522. Therefore, the first external thread portion 11 and the second external thread portion 12 are formed radially outward of both end portions of the flow passage hole 520, respectively. The flow passage hole 520 according to the present embodiment is formed with the same diameter as that of the flow passage hole 510.

An annular first sealing groove 15 is formed on the distal end surface of the one second projection portion 522, and an annular second sealing groove 16 is formed on the distal end surface of the other second projection portion 522.

The flow passage joint structure 1 includes the first external thread portion 11 of the first piping block 51, the second external thread portion 12 of the second piping block 52, a union nut 13, and a gasket (sealing member) 14 as main components.

In the present embodiment, the first external thread portion 11 is formed as a right-hand thread, and the second external thread portion 12 is formed as a left-hand thread. Contrary to the present embodiment, the first external thread portion 11 may be formed as a left-hand thread, and the second external thread portion 12 may be formed as a right-hand thread.

The union nut 13 has a first internal thread portion 13a composed of an internal thread formed on the inner periphery on one side in the axial direction thereof, and a second internal thread portion 13b composed of an internal thread formed on the inner periphery on the other side in the axial direction thereof. In the present embodiment, the first internal thread portion 13a and the second internal thread portion 13b are formed continuously in the axial direction.

The first internal thread portion 13a is screwed to the first external thread portion 11 of the first piping block 51. The second internal thread portion 13b is screwed to the second external thread portion 12 of the second piping block 52.

Therefore, in the present embodiment, the first internal thread portion 13a is formed as a right-hand thread, and the second internal thread portion 13b is formed as a left-hand thread. In the case where the first external thread portion 11 is formed as a left-hand thread and the second external thread portion 12 is formed as a right-hand thread, the first internal thread portion 13a is formed as a left-hand thread, and the second internal thread portion 13b is formed as a right-hand thread.

The gasket 14 serves to seal a connection portion between the flow passage holes 510 and 520 on the radially inner side of the union nut 13 when the first internal thread portion 13a is screwed to the first external thread portion 11 and the second internal thread portion 13b is screwed to the second external thread portion 12. The gasket 14 according to the present embodiment has an annular first press-fitting portion 14a formed on one side in the axial direction thereof and an annular second press-fitting portion 14b formed on the other side in the axial direction thereof. The first press-fitting portion 14a is press-fitted into the first sealing groove 15 of the first projection portion 512, and the second press-fitting portion 14b is press-fitted into the second sealing groove 16 of the second projection portion 522.

In the present embodiment, the gasket 14 is used as a sealing member which seals the connection portion between the flow passage holes 510 and 520, but another sealing member other than the gasket 14 may be used.

[Thread Start Positions and Mark Portions]

Figure 4:
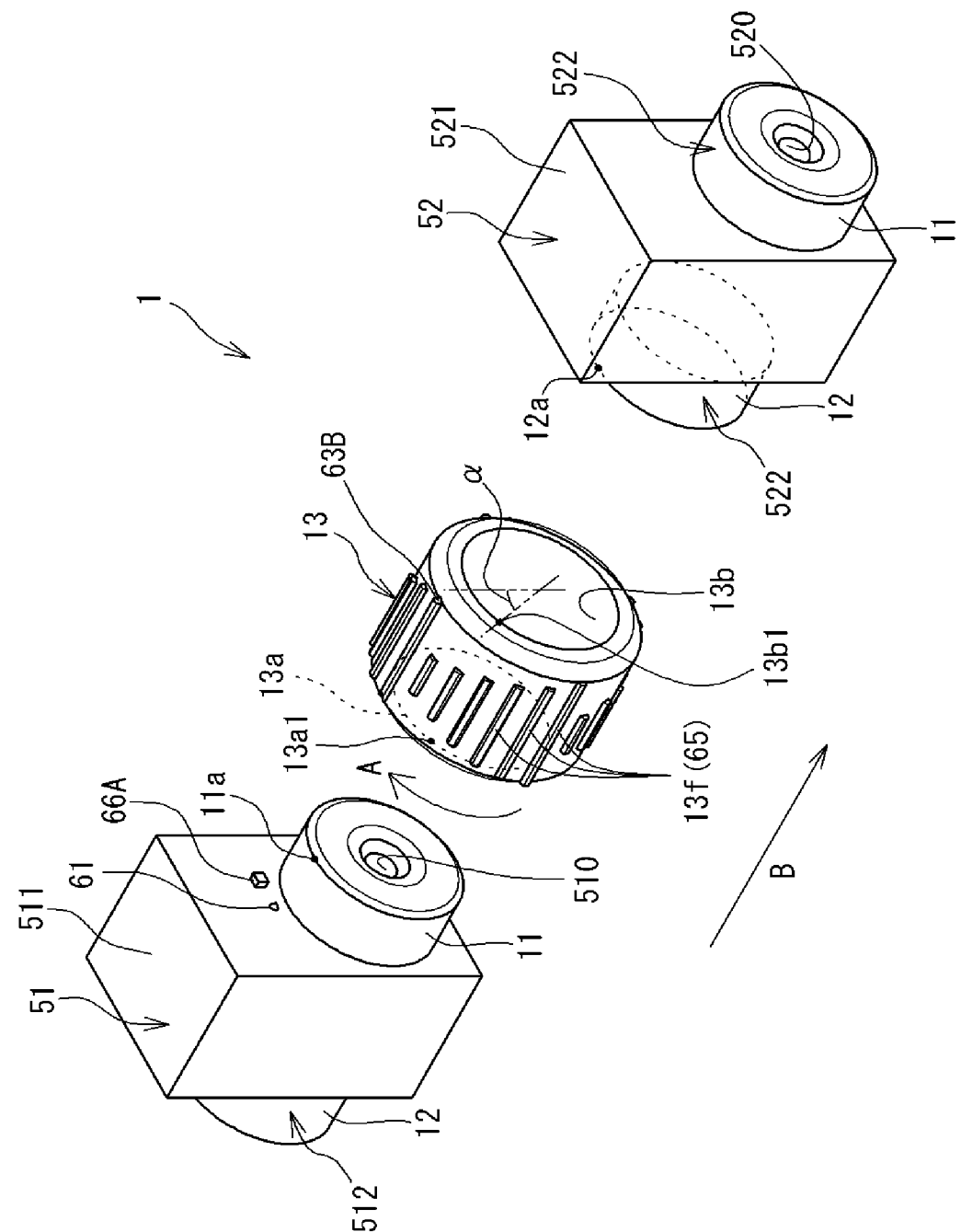
FIG. 4 is a perspective view showing a state where the flow passage joint structure is disassembled.

FIG. 4 is a perspective view showing a state where the flow passage joint structure 1 is disassembled. In FIG. 4, the gasket 14 is not shown (the same applies to FIG. 5). In FIG. 4, a thread start position 11a of the first external thread portion 11 and a thread start position 12a of the second external thread portion 12 are set at the same position in the circumferential direction (12 o'clock position in the shown example). A thread start position 13a1 of the first internal thread portion 13a and a thread start position 13b1 of the second internal thread portion 13b are set at the same position in the circumferential direction (substantially 10 o'clock position in the example of FIG. 4 when the union nut 13 is viewed from the second internal thread portion 13b side).

Accordingly, when tightening the union nut 13, the timing when screwing of the first internal thread portion 13a to the first external thread portion 11 is started and the timing when screwing of the second internal thread portion 13b to the second external thread portion 12 is started can be caused to coincide with each other. As a result, tightening of the first internal thread portion 13a to the first external thread portion 11 and tightening of the second internal thread portion 13b to the second external thread portion 12 can be easily managed.

Figure 5:
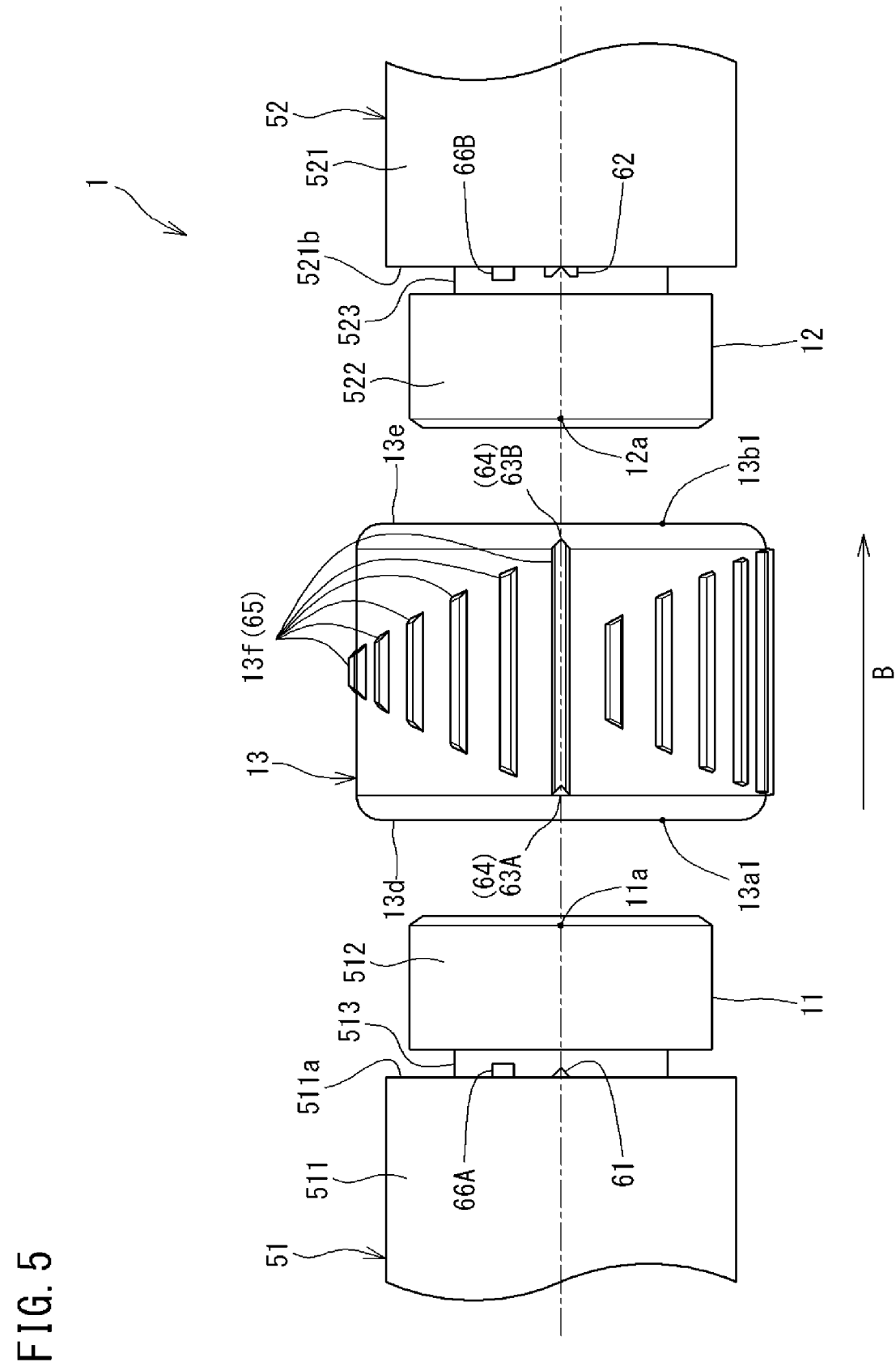
FIG. 5 is a plan view of the flow passage joint structure in FIG. 4.

FIG. 5 is a plan view of the flow passage joint structure 1 in FIG. 4. In FIG. 4 and FIG. 5, a first mark portion 61 indicating the thread start position 11a of the first external thread portion 11 is provided on the upper side of the one end surface 511a of the block body 511 so as to project laterally (rightward in FIG. 5). The first mark portion 61 is formed so as to project, for example, in a tapered shape. The first mark portion 61 is formed so as to project from the one end surface 511a by an amount shorter than the length in the axial direction of the annular groove 513.

In the present embodiment, the most distal end position of the first mark portion 61 with respect to the circumferential direction of the first external thread portion 11 is located at the same position (12 o'clock position in the shown example) as the thread start position 11a of the first external thread portion 11. That is, the most distal end position of the first mark portion 61 indicates the actual thread start position 11a of the first external thread portion 11.

A second mark portion 62 indicating the thread start position 12a of the second external thread portion 12 is provided on the upper side of the other end surface 521b of the block body 521 so as to project laterally (leftward in FIG. 5). A center portion of a projection end surface of the second mark portion 62 is, for example, recessed in a V shape. The second mark portion 62 is formed so as to project from the other end surface 521b by an amount shorter than the length in the axial direction of the annular groove 523.

In the present embodiment, the most recessed position of the second mark portion 62 with respect to the circumferential direction of the second external thread portion 12 is located at the same position (12 o'clock position in the shown example) as the thread start position 12a of the second external thread portion 12. That is, the most recessed position of the second mark portion 62 indicates the actual thread start position 12a of the second external thread portion 12.

A third mark portion 63A indicating the thread start position 13a1 of the first internal thread portion 13a is provided on the first internal thread portion 13a side of the outer periphery of the union nut 13. The third mark portion 63A is formed, for example, at one end portion in the longitudinal direction of a later-described protrusion portion 13f so as to be recessed in a V shape.

A third mark portion 63B indicating the thread start position 13b1 of the second internal thread portion 13b is provided on the second internal thread portion 13b side of the outer periphery of the union nut 13. The third mark portion 63B is formed, for example, at another end portion in the longitudinal direction of the protrusion portion 13f so as to project in a tapered shape.

The most distal end position of the third mark portion 63B is a position slightly shifted from the actual thread start position 13b1 of the second internal thread portion 13b in the circumferential direction. In the present embodiment, the most distal end position of the third mark portion 63B on the union nut 13 is a position (12 o'clock position in the state shown in FIG. 4) shifted in the tightening direction of the union nut 13 (arrow A direction in FIG. 4) by a predetermined angle α. That is, the most distal end position of the third mark portion 63B indicates a position shifted from the actual thread start position 13b1 of the second internal thread portion 13b in the tightening direction by the predetermined angle α.

Similarly, the most recessed position of the third mark portion 63A is a position slightly shifted from the actual thread start position 13a1 of the first internal thread portion 13a in the circumferential direction. In the present embodiment, the most recessed position of the third mark portion 63A on the union nut 13 is a position shifted in the tightening direction of the union nut 13 by the predetermined angle α. That is, the most recessed position of the third mark portion 63A indicates a position shifted from the actual thread start position 13a1 of the first internal thread portion 13a in the tightening direction by the predetermined angle α.

In FIG. 1 to FIG. 3, the first mark portion 61, the second mark portion 62, and the third mark portions 63A and 63B are not shown (the same applies to FIG. 6 to FIG. 9).

Due to the above configuration, the thread start position 11a of the first external thread portion 11 and the thread start position 13a1 of the first internal thread portion 13a can be easily aligned with each other by aligning the most distal end position of the first mark portion 61 and the most recessed position of the third mark portion 63A with each other. In addition, the thread start position 12a of the second external thread portion 12 and the thread start position 13b1 of the second internal thread portion 13b can be easily aligned with each other by aligning the most recessed position of the second mark portion 62 and the most distal end position of the third mark portion 63B with each other.

The first mark portion 61 and the second mark portion 62 indicate the actual thread start positions 11a and 12a, respectively, and the third mark portion 63A and the third mark portion 63B indicate the positions shifted from the actual thread start positions 13a1 and 13b1 in the tightening direction of the union nut 13 by the predetermined angle α, respectively. Accordingly, at the time of tightening the union nut 13, when the first mark portion 61 and the third mark portion 63A are aligned with each other and the second mark portion 62 and the third mark portion 63B are aligned with each other, the actual thread start position 11a of the first external thread portion 11 and the actual thread start position 13a1 of the first internal thread portion 13a are shifted from each other in the circumferential direction by the predetermined angle α, and the actual thread start position 12a of the second external thread portion 12 and the actual thread start position 13b1 of the second internal thread portion 13b are shifted from each other in the circumferential direction by the predetermined angle α.

Therefore, by rotating the union nut 13 in the tightening direction from this state, the first internal thread portion 13a is screwed to the first external thread portion 11 such that the actual thread start position 13a1 coincides with the actual thread start position 11a, and the second internal thread portion 13b is screwed to the second external thread portion 12 such that the actual thread start position 13b1 coincides with the actual thread start position 12a. As a result, as compared to the case where the actual thread start position 13a1 coincides with the actual thread start position 11a and the actual thread start position 13b1 coincides with the actual thread start position 12a at the time of starting tightening of the union nut 13, the first internal thread portion 13a can be smoothly screwed to the first external thread portion 11, and the second internal thread portion 13b can be smoothly screwed to the second external thread portion 12.

In the present embodiment, the first mark portion 61 and the second mark portion 62 indicate the actual thread start positions 11a and 12a, respectively, and the third mark portions 63A and 63B indicate the positions shifted from the actual thread start positions 13a1 and 13b1 in the circumferential direction, respectively. However, the first mark portion 61 and the second mark portion 62 may indicate positions shifted from the actual thread start positions 11a and 12a in the circumferential direction, and the third mark portions 63A and 63B may indicate the actual thread start positions 13a1 and 13b1. In this case, it is sufficient that the first mark portion 61 and the second mark portion 62 indicate positions shifted from the actual thread start positions 11a and 12a in a direction opposite to the tightening direction of the union nut 13.

The third mark portions 63A and 63B according to the present embodiment are formed so as to be integrated with the protrusion portion 13f, but may be provided so as to be separate from the protrusion portion 13f.

The third mark portion 63A indicating the thread start position 13a1 of the first internal thread portion 13a, and the third mark portion 63B indicating the thread start position 13b1 of the second internal thread portion 13b are provided to the union nut 13 according to the present embodiment, but, only the third mark portion 63A may be provided thereto or only the third mark portion 63B may be provided thereto.

In FIG. 4 and FIG. 5, in the present embodiment, as shown by an arrow B, a fluid (chemical solution or the like) flows from the flow passage hole 510 of the first piping block 51 via the union nut 13 toward the flow passage hole 520 of the second piping block 52. The recess shape of the third mark portion 63A and the projection shape of the third mark portion 63B on the union nut 13 indicate the flow direction of the fluid flowing in the union nut 13.

Therefore, in the present embodiment, the third mark portion 63A and the third mark portion 63B indicating the thread start positions 13a1 and 13b1 of the first internal thread portion 13a and the second internal thread portion 13b, respectively, also serve as a flow direction mark portion 64 indicating the flow direction of the fluid flowing in the union nut 13. Accordingly, an operator can easily grasp the axial orientation of the union nut 13, which is disposed between the first piping block 51 and the second piping block 52, by viewing the flow direction mark portion 64 of the union nut 13. As a result, the first external thread portion 11 and the first internal thread portion 13a, which are composed of right-hand threads, can be reliably screwed to each other, and the second external thread portion 12 and the second internal thread portion 13b, which are composed of left-hand threads, can be reliably screwed to each other.

On the outer peripheral surface of the union nut 13, a plurality of protrusion portions 13f for hooking a tool for tightening the union nut 13 are formed at predetermined intervals in the circumferential direction so as to extend in the axial direction, for example, by knurling. In the present embodiment, for example, as shown, each of sets of a predetermined number of protrusion portions 13f is formed in the circumferential direction such that an arrow shape is formed as a whole, by gradually shortening the lengths in the axial direction thereof. These arrow shapes indicate the tightening direction of the union nut 13.

Therefore, in the present embodiment, the plurality of arrow shapes formed by the sets of the predetermined number of protrusion portions 13f, respectively, serve as a tightening direction mark portion 65 indicating the tightening direction of the union nut 13. Accordingly, the operator can easily grasp the tightening direction of the union nut 13 by viewing the tightening direction mark portion 65 of the union nut 13.

The flow direction mark portion 64 according to the present embodiment is formed as the third mark portion 63A and the third mark portion 63B, but may be provided so as to be separate from the third mark portion 63A and the third mark portion 63B. In addition, the flow direction mark portion 64 according to the present embodiment indicates the flow direction of the fluid by the shape thereof, but may be an arrow or the like indicating the flow direction and represented on the union nut 13.

The tightening direction mark portion 65 according to the present embodiment is formed as the protrusion portions 13f formed on the outer periphery of the union nut 13, but may be provided so as to be separate from the protrusion portions 13f. In addition, the tightening direction mark portion 65 according to the present embodiment indicates the tightening direction of the union nut 13 by the shapes of the protrusion portions 13f, but may be an arrow or the like indicating the tightening direction and represented on the union nut 13.

In FIG. 5, a contact portion 66A with which another side surface 13d of the union nut 13 comes into contact is provided on the one end surface 511a of the block body 511 in the first piping block 51 so as to project laterally (rightward in FIG. 5). The contact portion 66A projects in the axial direction by an amount larger than that of the first mark portion 61, and is formed so as to be shorter than the length in the axial direction of the annular groove 513. In addition, the amount by which the contact portion 66A projects in the axial direction is set such that, when retightening of the union nut 13 reaches its limit, the other side surface 13d of the union nut 13 comes into contact with the distal end surface of the contact portion 66A.

A contact portion 66B with which one side surface 13e of the union nut 13 comes into contact is provided on the other end surface 521b of the block body 521 in the second piping block 52 so as to project laterally (leftward in FIG. 5). The contact portion 66B projects in the axial direction by an amount larger than that of the second mark portion 62, and is formed so as to be shorter than the length in the axial direction of the annular groove 523. In addition, the amount by which the contact portion 66B projects in the axial direction is set such that, when retightening of the union nut 13 reaches its limit, the one side surface 13e of the union nut 13 comes into contact with the distal end surface of the contact portion 66B.

The contact portions 66A and 66B, with which the union nut 13 comes into contact, are provided to the first piping block 51 and the second piping block 52 according to the present embodiment, respectively. However, only the contact portion 66A may be provided to the first piping block 51, or only the contact portion 66B may be provided to the second piping block 52.

In FIG. 1 to FIG. 3, the contact portion 66A and the contact portion 66B are not shown.

[Connection Procedure by Flow Passage Joint Structure]

Next, the procedure for connecting the flow passage holes 510 and 520 of the first piping block 51 and the second piping block 52 to each other by the flow passage joint structure 1 according to the present embodiment will be described. First, as shown in FIG. 6, the operator press-fits the first press-fitting portion 14a of the gasket 14 into the first sealing groove of the first piping block 51 to integrally mount the gasket 14 to the first piping block 51.

The gasket 14 may be integrally mounted to the second piping block 52. In this case, the operator may press-fit the second press-fitting portion 14b of the gasket 14 into the second sealing groove 16 of the second piping block 52.

Next, the operator places the union nut 13 between the first piping block 51 and the second piping block 52. At that time, the operator can easily grasp the axial orientation of the union nut 13 by viewing the flow direction mark portion 64 (see FIG. 5) of the union nut 13.

Figure 6:
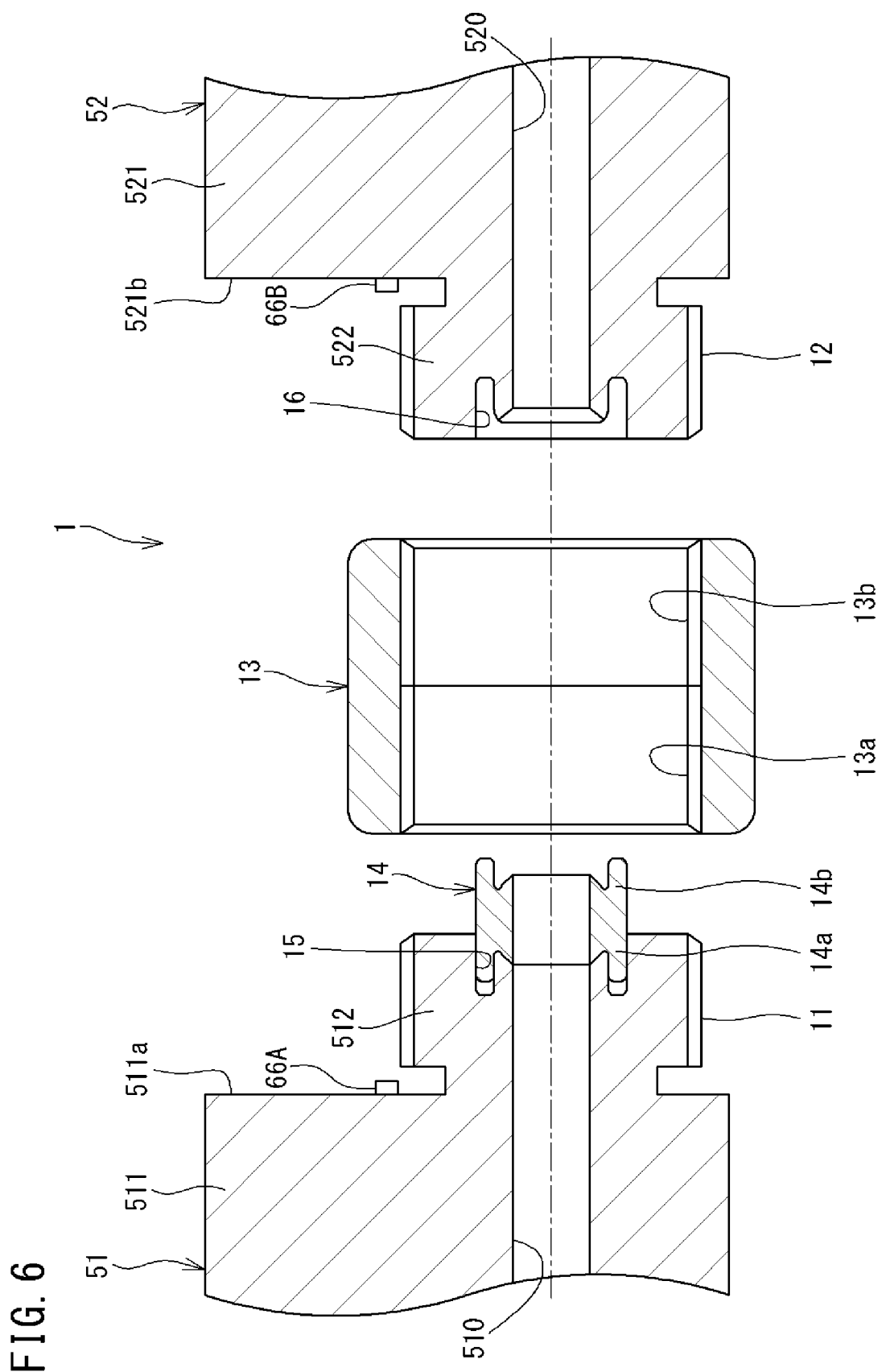
FIG. 6 is a cross-sectional view showing a state where a gasket is mounted on a first piping block.

Next, the operator rotates the union nut 13 in the tightening direction or the direction opposite thereto in the state shown in FIG. 6 to align the first mark portion 61 and the third mark portion 63A with each other and align the second mark portion 62 and the third mark portion 63B with each other as shown in FIG. 5. Accordingly, the thread start position 11a of the first external thread portion 11 and the thread start position 13a1 of the first internal thread portion 13a are aligned with each other, and the thread start position 12a of the second external thread portion 12 and the thread start position 13b1 of the second internal thread portion 13b are aligned with each other.

In the present embodiment, the third mark portion 63A and the third mark portion 63B indicate the positions shifted from the actual thread start positions 13a1 and 13b1 in the tightening direction of the union nut 13 by the predetermined angle α, respectively (see FIG. 4). Thus, when the first mark portion 61 and the third mark portion 63A are aligned with each other and the second mark portion 62 and the third mark portion 63B are also aligned with each other, the first mark portion 61 and the third mark portion 63A are aligned such that the actual thread start position 11a of the first external thread portion 11 and the actual thread start position 13a1 of the first internal thread portion 13a are shifted from each other in the circumferential direction by the predetermined angle α, and the second mark portion 62 and the third mark portion 63B are aligned such that the actual thread start position 12a of the second external thread portion 12 and the actual thread start position 13b1 of the second internal thread portion 13b are shifted from each other in the circumferential direction by the predetermined angle α.

Next, the operator brings the distal end of the first projection portion 512 of the first piping block 51 and the distal end of the second projection portion 522 of the second piping block 52 into contact with both ends in the axial direction of the union nut 13, respectively, from the state shown in FIG. 6, and then starts tightening the union nut 13 by using a tool (not shown) or the like. At that time, the operator can easily grasp the tightening direction of the union nut 13 by viewing the tightening direction mark portion 65 (see FIG. 4) of the union nut 13.

When the operator rotates the union nut 13 by the predetermined angle α after starting tightening of the union nut 13, the actual thread start position 13a1 coincides with the actual thread start position 11a, and the actual thread start position 13b1 coincides with the actual thread start position 12a. When the union nut 13 further rotates in the tightening direction from this state, the first internal thread portion 13a on the right-hand thread side starts being screwed to the first external thread portion 11, and the second internal thread portion 13b on the left-hand thread side starts being screwed to the second external thread portion 12 at the same time. Accordingly, the timing when screwing of the first internal thread portion 13a to the first external thread portion 11 is started and the timing when screwing of the second internal thread portion 13b to the second external thread portion 12 is started can be caused to coincide with each other.

Figure 7:
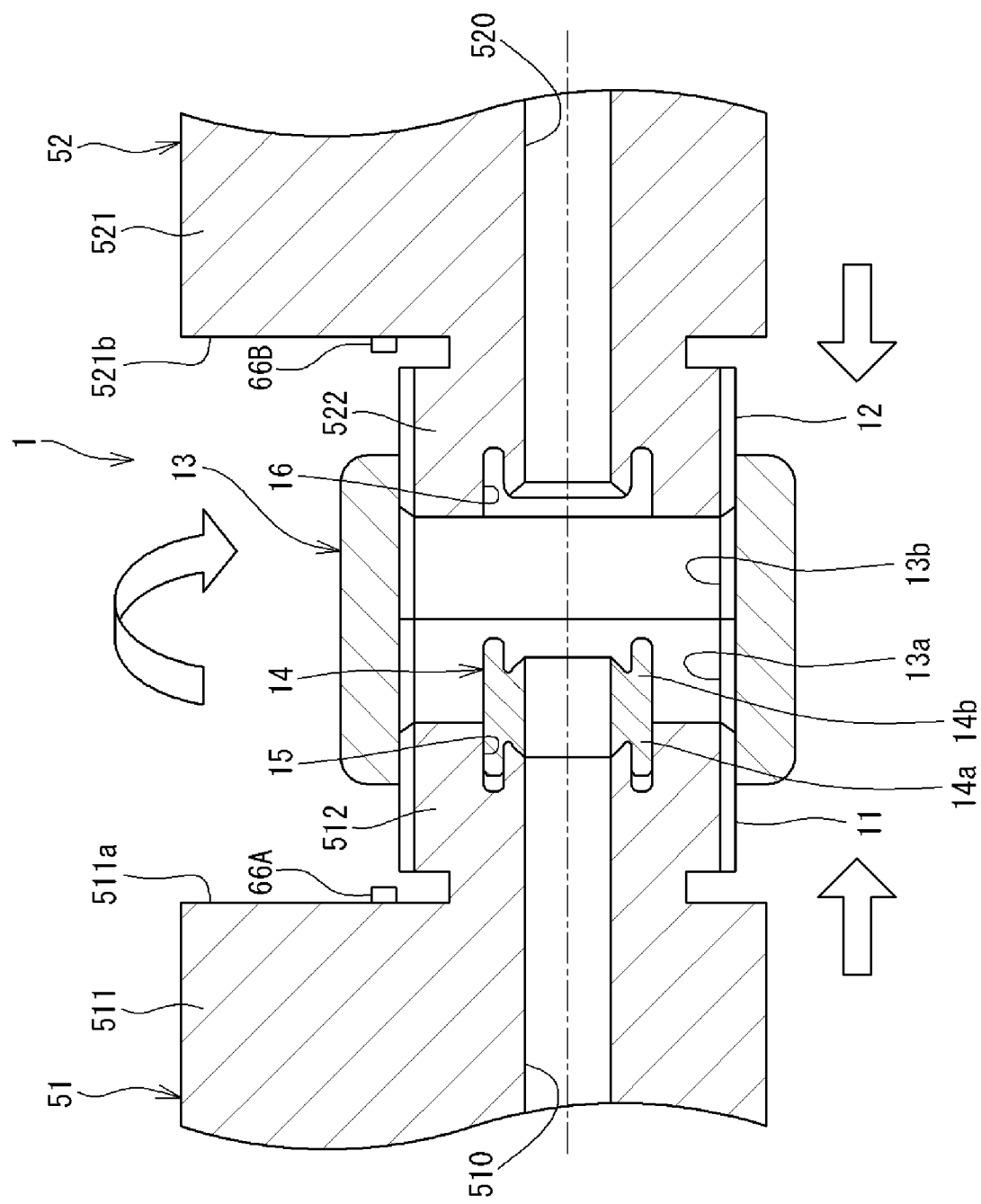
FIG. 7 is a cross-sectional view showing a state where a union nut is being tightened.

When the operator further tightens the union nut 13, as shown in FIG. 7, the screwing of the first external thread portion 11 to the first internal thread portion 13a proceeds, whereby the first projection portion 512 of the first piping block 51 moves from one side in the axial direction (left side in FIG. 7) of the union nut 13 toward the center in the axial direction. Similarly, the screwing of the second external thread portion 12 to the second internal thread portion 13b proceeds, whereby the second projection portion 522 of the second piping block 52 moves from the other side in the axial direction (right side in FIG. 7) of the union nut 13 toward the center in the axial direction.

Figure 8:
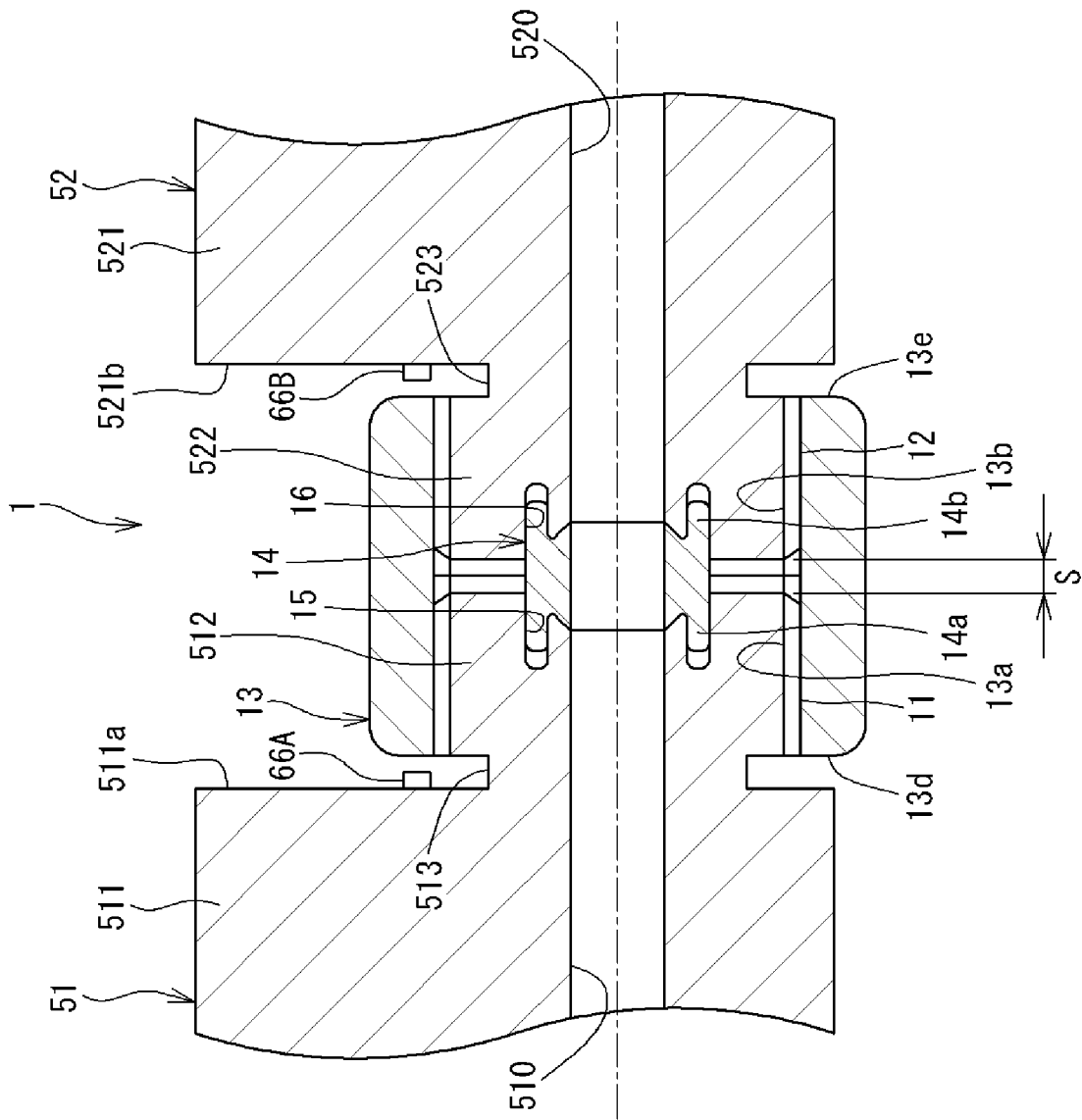
FIG. 8 is a cross-sectional view showing a state where tightening of the union nut has been completed.

When the first projection portion 512 and the second projection portion 522 move from both sides in the axial direction of the union nut 13 toward the center in the axial direction as described above, a state where the entirety of the first external thread portion 11 and the entirety of the second external thread portion 12 have entered the inside of the union nut 13 as shown in FIG. 8 is obtained. Accordingly, the second press-fitting portion 14b of the gasket 14 is press-fitted into the second sealing groove 16 of the second piping block 52, so that the flow passage holes 510 and 520 are connected to each other, and the connection portion therebetween is sealed by the gasket 14.

In the present embodiment, the state shown in FIG. 8, that is, the state where the entirety of the first external thread portion 11 and the entirety of the second external thread portion 12 have entered the inside of the union nut 13, is a state where tightening of the union nut 13 has been completed. Therefore, the operator can easily grasp the completion of tightening of the union nut 13 by confirming that the first external thread portion 11 and the second external thread portion 12 are not visible from the outside of the union nut 13. The method for the operator to grasp the completion of tightening is not limited to confirming that the first external thread portion 11 and the second external thread portion 12 are not visible from the outside of the union nut 13 as described above.

Figure 13:
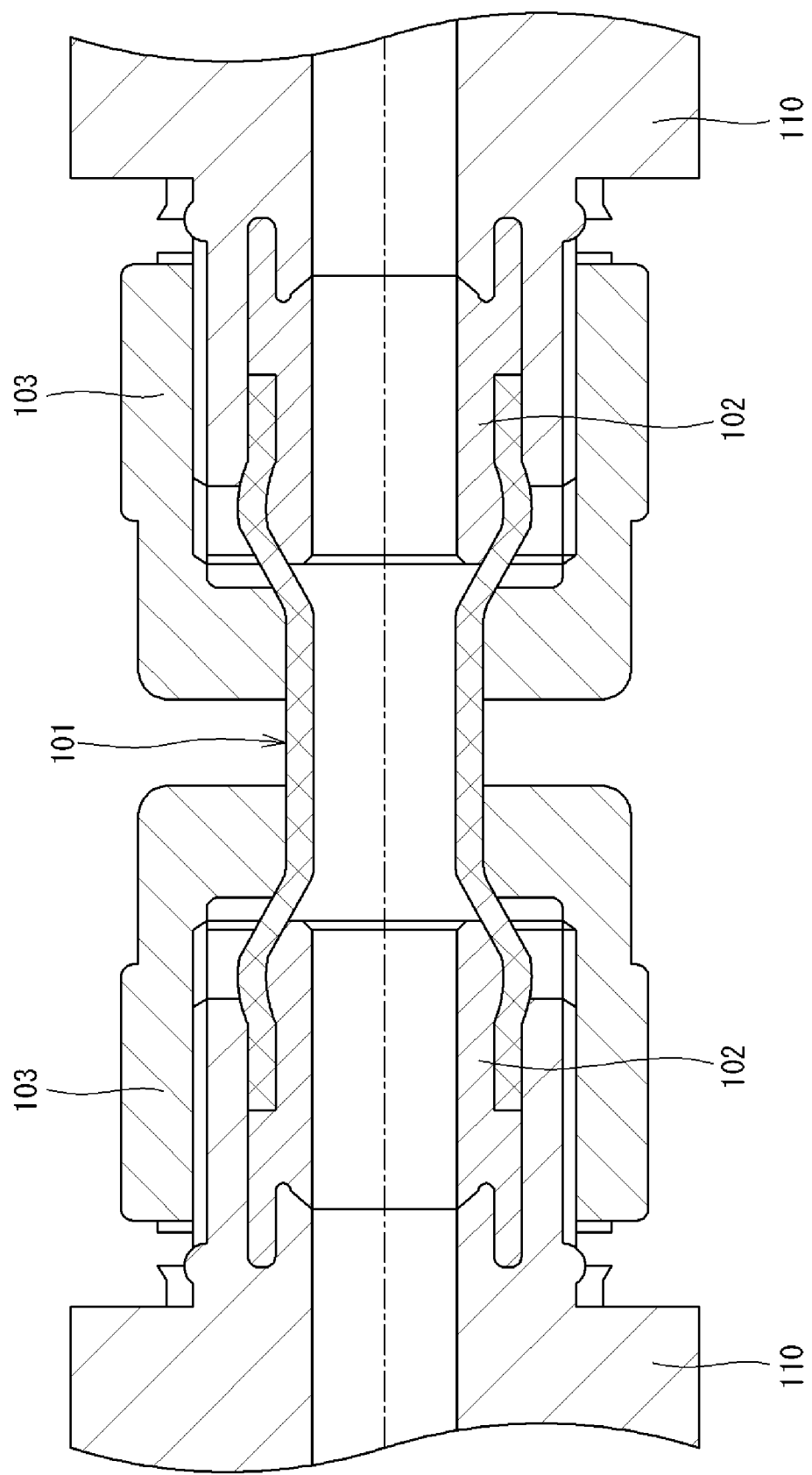
FIG. 13 is a cross-sectional view showing a conventional flow passage joint structure.

As described above, in the flow passage joint structure 1 according to the present embodiment, the right-hand thread and the left-hand thread are formed as the first internal thread portion 13a and the second internal thread portion 13b in the union nut 13. Thus, by tightening the union nut 13, the first internal thread portion 13a is screwed to the first external thread portion 11 of the first piping block 51, and the second internal thread portion 13b is screwed to the second external thread portion 12 of the second piping block 52. Accordingly, the flow passage holes 510 and 520 of the first piping block 51 and the second piping block 52 can be connected to each other only by the one union nut 13, and the connection portion between the flow passage holes 510 and 520 can be sealed by the gasket 14 on the radially inner side of the union nut 13. Therefore, for the flow passage joint structure 1 according to the present embodiment, it is not necessary to install the tube 101 and the two union nuts 103 as in the conventional structure shown in FIG. 13, and thus the flow passage joint structure 1 can be installed in a small space.

In the flow passage joint structure 1 according to the present embodiment, the thread start position 11a of the first external thread portion 11 and the thread start position 12a of the second external thread portion 12 are set at the same position in the circumferential direction, and the thread start position 13a1 of the first internal thread portion 13a and the thread start position 13b1 of the second internal thread portion 13b are set at the same position in the circumferential direction.

Therefore, at the time of tightening the union nut 13, the timing when screwing of the first internal thread portion 13a to the first external thread portion 11 is started, and the timing when screwing of the second internal thread portion 13b to the second external thread portion 12 is started, can be caused to coincide with each other. Accordingly, tightening of the first internal thread portion 13a to the first external thread portion 11 and tightening of the second internal thread portion 13b to the second external thread portion 12 can be easily managed.

Moreover, it is not necessary to form a non-threaded portion 13c between the first internal thread portion 13a and the second internal thread portion 13b of the union nut 13 as in a second embodiment (see FIG. 10) described later. Thus, the union nut 13 can be made compact in the axial direction. Accordingly, the flow passage joint structure 1 can be installed in a smaller space.

In the state shown in FIG. 8, a gap S is formed between the distal end surface of the first external thread portion 11 and the distal end surface of the second external thread portion 12. The gap S is a gap (space) for enabling retightening of the union nut 13 from the state shown in FIG. 8. Therefore, the operator can retighten the union nut 13 by further rotating the union nut 13 in the tightening direction from the state (state shown in FIG. 8) where tightening of the union nut 13 has been completed.

Figure 9:
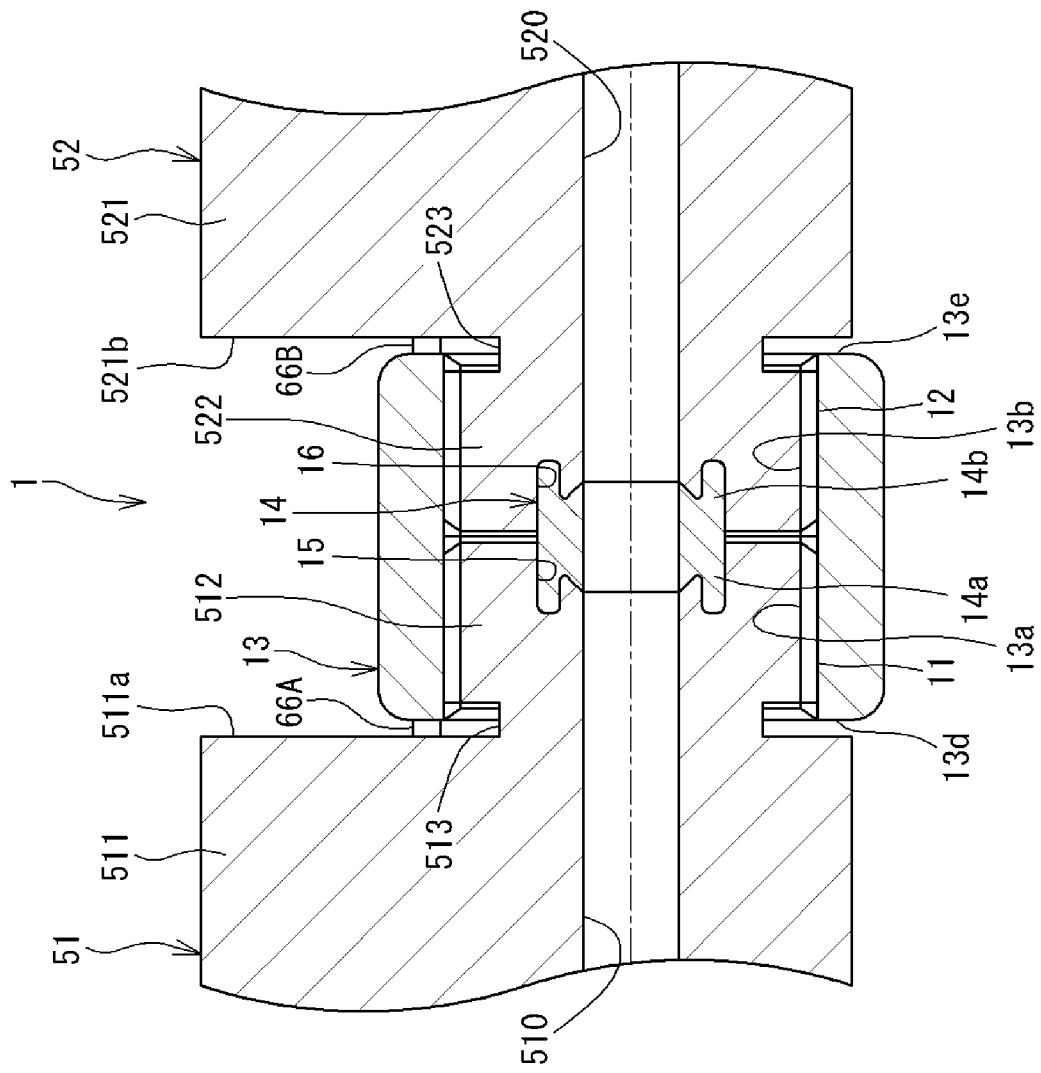
FIG. 9 is a cross-sectional view showing a state where retightening of the union nut has reached its limit.

In the case where retightening of the union nut 13 is performed, as shown in FIG. 9, when the retightening of the union nut 13 reaches its limit, the other side surface 13d of the union nut 13 comes into contact with the contact portion 66A of the first piping block 51, and the one side surface 13e of the union nut 13 comes into contact with the contact portion 66B of the second piping block 52. Therefore, the operator can easily grasp that the retightening of the union nut 13 has reached its limit, by a torque change due to the contact of the union nut 13 with both contact portions 66A and 66B.

Figure 10:
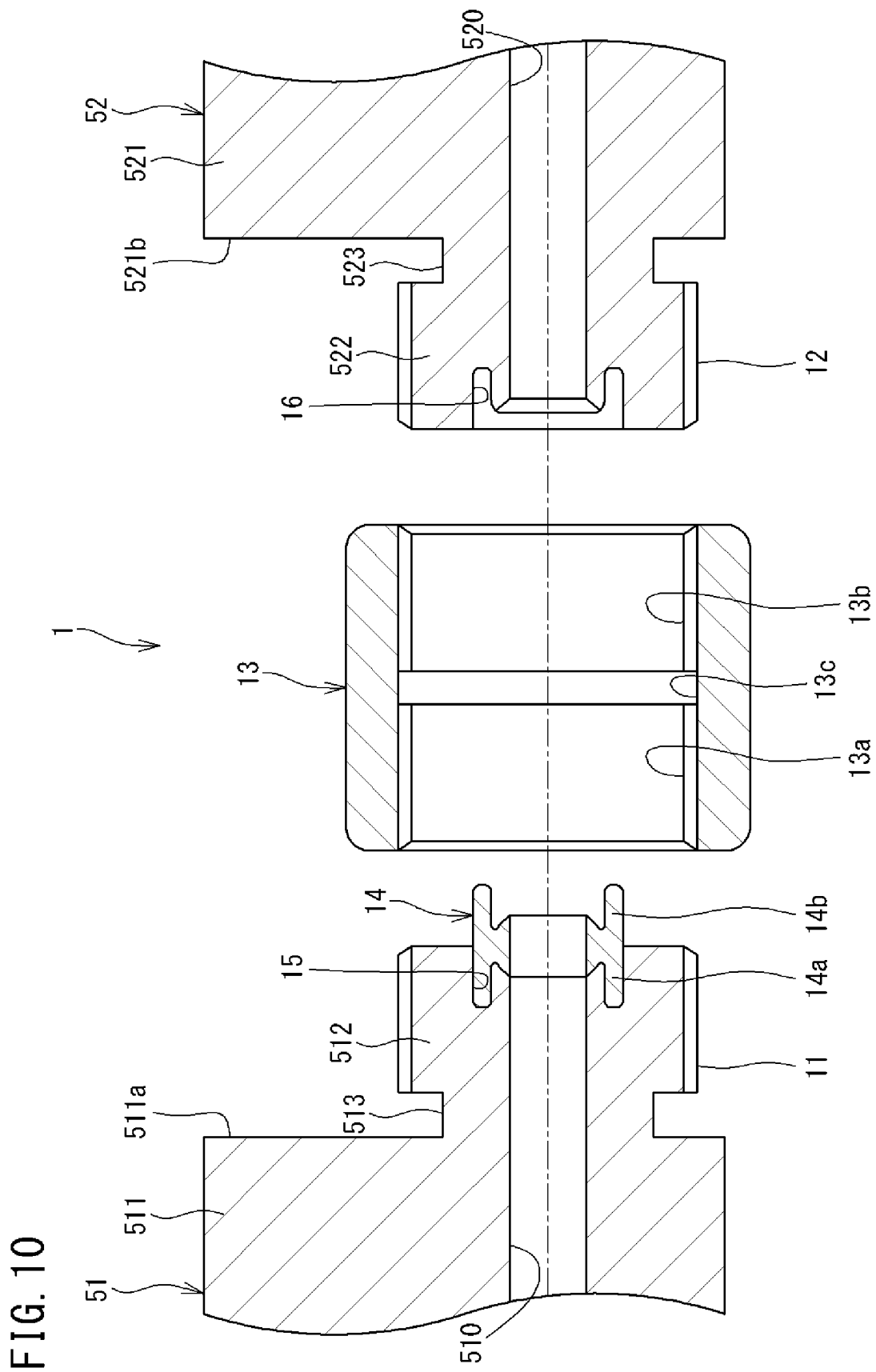
FIG. 10 is a perspective view showing a state where a flow passage joint structure according to a second embodiment of the present invention is disassembled.

FIG. 10 is a cross-sectional view showing a state where a flow passage joint structure according to the second embodiment of the present invention is disassembled. The union nut 13 in the flow passage joint structure 1 according to the present embodiment has the non-threaded portion 13c formed between the first internal thread portion 13a and the second internal thread portion 13b. The non-threaded portion 13c is a portion, of the inner periphery of the union nut 13, on which an internal thread is not formed.

Figure 11:
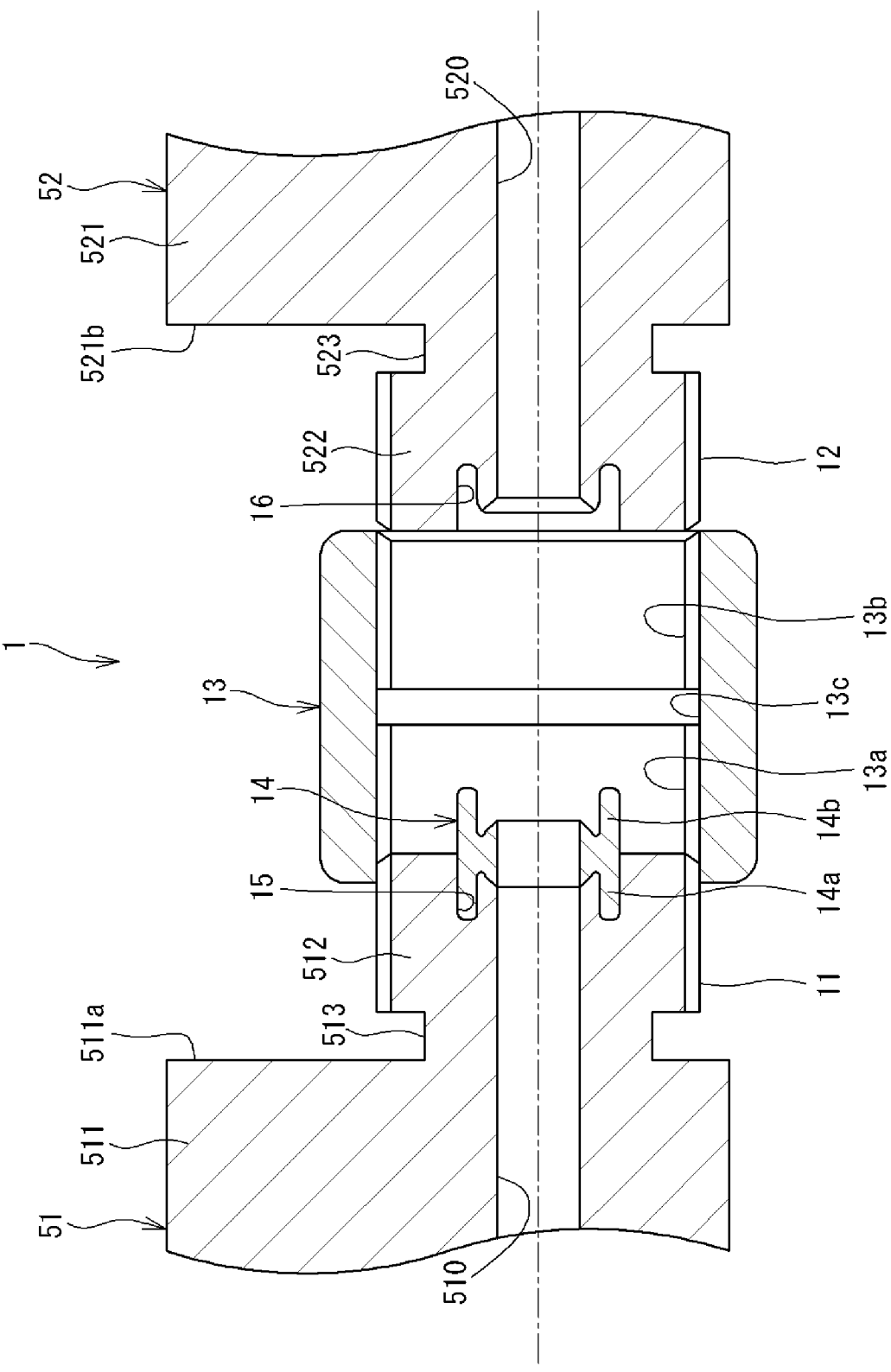
FIG. 11 is a cross-sectional view showing a state where tightening of a union nut according to the second embodiment has been started.

In the flow passage joint structure 1 according to the present embodiment, although not shown, the thread start position of the first internal thread portion 13a and the thread start position of the second internal thread portion 13b are set at the same position in the circumferential direction, and the thread start position of the first external thread portion 11 and the thread start position of the second external thread portion 12 are set at different positions in the circumferential direction. Thus, in the present embodiment, for example, as shown in FIG. 11, the timing when screwing of the second internal thread portion 13b to the second external thread portion 12 is started may be delayed from the timing when screwing of the first internal thread portion 13a to the first external thread portion 11 is started.

In this case, even after tightening of the first internal thread portion 13a to the first external thread portion 11 is completed, the operator tightens the union nut 13 until tightening of the second internal thread portion 13b to the second external thread portion 12 is completed. Accordingly, the first external thread portion 11 composed of a right-hand thread moves toward the second internal thread portion 13b composed of a left-hand thread to which the first external thread portion 11 cannot be screwed.

Figure 12:
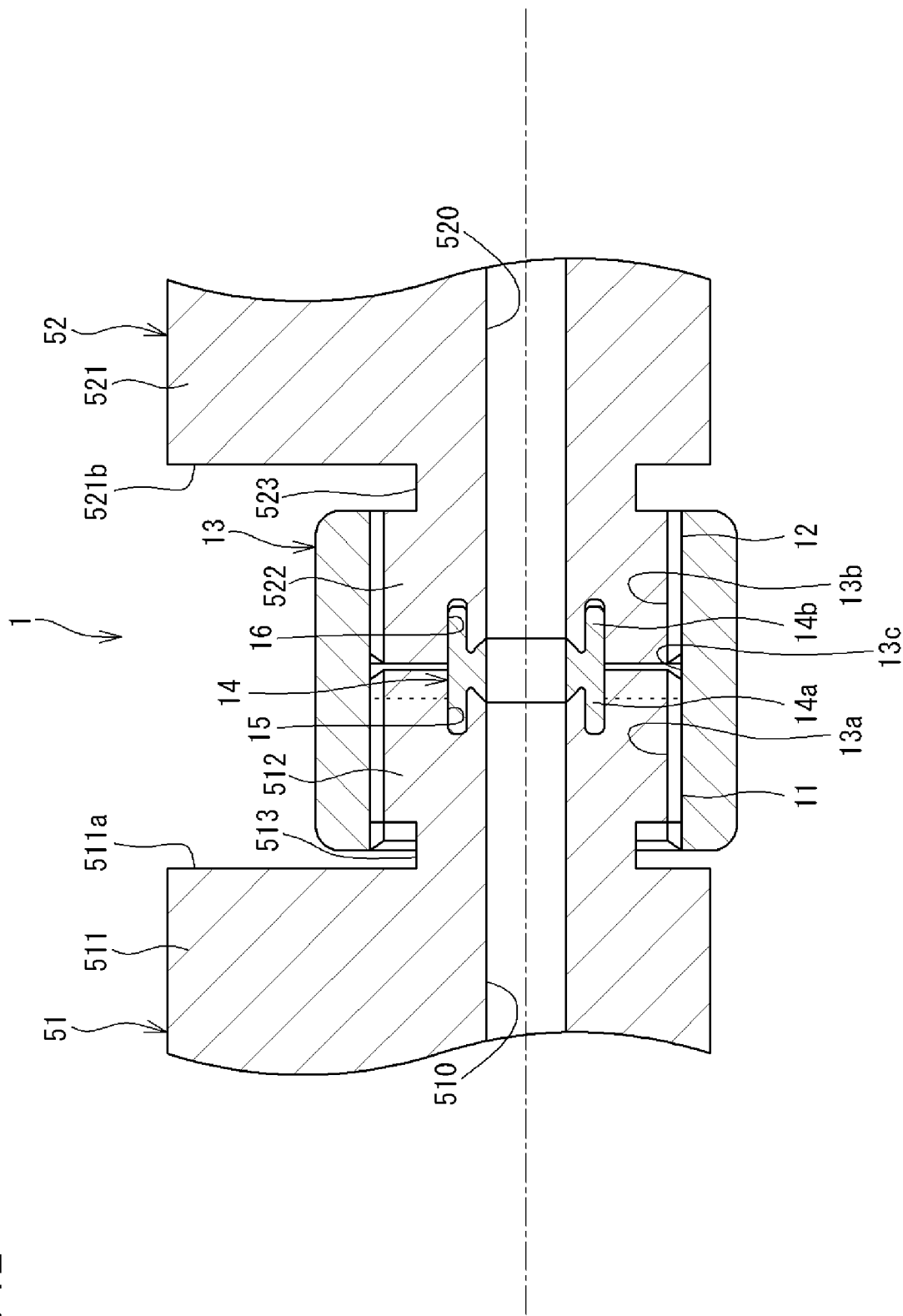
FIG. 12 is a cross-sectional view showing a state where tightening of the union nut according to the second embodiment has been completed.

However, in the union nut 13 according to the present embodiment, the non-threaded portion 13c is formed between the first internal thread portion 13a and the second internal thread portion 13b as described above. Thus, as shown in FIG. 12, even when the first external thread portion 11 moves toward the second internal thread portion 13b until tightening of the second internal thread portion 13b to the second external thread portion 12 is completed, the first external thread portion 11 moves to a position corresponding to the non-threaded portion 13c. Accordingly, the first external thread portion 11 can be inhibited from moving to the screwing position of the second internal thread portion 13b. Therefore, damage to the first external thread portion 11 and the second internal thread portion 13b due to the first external thread portion 11 moving to the screwing position of the second internal thread portion 13b, can be effectively inhibited.

[Others]

The case where the flow passage joint structure according to each of the embodiments is used for a semiconductor manufacturing apparatus has been described, but the flow passage joint structure may be used in the liquid crystal/organic EL field, the medical/pharmaceutical field, the automotive field, etc.

As the union nut 13 according to the first embodiment, the union nut 13 according to the second embodiment having the non-threaded portion 13c may be used. In this case, even if the timing when screwing of the first internal thread portion 13a to the first external thread portion 11 is started and the timing when screwing of the second internal thread portion 13b to the second external thread portion 12 is started become different from each other due to an operational error or the like when tightening the union nut 13, tightening of the union nut 13 can be completed, and the external thread portions and the internal thread portions can be inhibited from being damaged.

The embodiments disclosed herein are merely illustrative in all aspects and should be considered not restrictive. The scope of the present invention is defined by the scope of the claims rather than the meaning described above, and is intended to include meaning equivalent to the scope of the claims and all modifications within the scope.

REFERENCE SIGNS LIST 1 flow passage joint structure
11 first external thread portion
11a thread start position
12 second external thread portion
12a thread start position
13 union nut
13a first internal thread portion
13a1 thread start position
13b second internal thread portion
13b1 thread start position
13c non-threaded portion
14 gasket (sealing member)
51 first piping block (fluid device)
52 second piping block (fluid device)
61 first mark portion
62 second mark portion
63A third mark portion
63B third mark portion
64 flow direction mark portion
65 tightening direction mark portion
66A contact portion
66B contact portion
510 flow passage hole
520 flow passage hole

The invention claimed is:

1. A flow passage joint structure for connecting flow passage holes formed in two fluid devices, respectively, to each other, the flow passage joint structure comprising:
   a first external thread portion formed, at an end portion of one fluid device of the two fluid devices, radially outward of the flow passage hole of the one fluid device;
   a second external thread portion formed, at an end portion of the other fluid device of the two fluid devices, radially outward of the flow passage hole of the other fluid device;
   a union nut having a first internal thread portion to be screwed to the first external thread portion, on one side in an axial direction thereof, and having a second internal thread portion to be screwed to the second external thread portion, on another side in the axial direction thereof; and
   a sealing member configured to seal a connection portion between the flow passage holes in the two fluid devices on a radially inner side of the union nut when the first internal thread portion is screwed to the first external thread portion and the second internal thread portion is screwed to the second external thread portion, wherein
   each of the first external thread portion and the first internal thread portion is one of a right-hand thread and a left-hand thread, and
   each of the second external thread portion and the second internal thread portion is the other of the right-hand thread and the left-hand thread,
   a thread start position of the first external thread portion and a thread start position of the second external thread portion are set at a same position in a circumferential direction, and
   a thread start position of the first internal thread portion and a thread start position of the second internal thread portion are set at a same position in the circumferential direction,
   the flow passage joint structure comprising:
      a first mark portion provided to the one fluid device and indicating the thread start position of the first external thread portion;
      a second mark portion provided to the other fluid device and indicating the thread start position of the second external thread portion; and
      a third mark portion provided to the union nut and indicating a position shifted, in a tightening direction of the union nut by a predetermined angle, from at least one of the thread start position of the first internal thread portion and the thread start position of the second internal thread portion.

2. The flow passage joint structure according to claim 1, wherein the union nut further has a non-threaded portion formed between the first internal thread portion and the second internal thread portion.

3. The flow passage joint structure according to claim 1, wherein at least one of the two fluid devices has a contact portion with which the union nut comes into contact when retightening of the union nut reaches a limit thereof.

4. The flow passage joint structure according to claim 1, further comprising a flow direction mark portion provided to the union nut and indicating a flow direction of a fluid flowing in the union nut.

5. The flow passage joint structure according to claim 1, further comprising a tightening direction mark portion provided to the union nut and indicating a tightening direction of the union nut.

6. A flow passage joint structure for connecting flow passage holes formed in two fluid devices, respectively, to each other, the flow passage joint structure comprising:
   a first external thread portion formed, at an end portion of one fluid device of the two fluid devices, radially outward of the flow passage hole of the one fluid device;
   a second external thread portion formed, at an end portion of the other fluid device of the two fluid devices, radially outward of the flow passage hole of the other fluid device;
   a union nut having a first internal thread portion to be screwed to the first external thread portion, on one side in an axial direction thereof, and having a second internal thread portion to be screwed to the second external thread portion, on another side in the axial direction thereof; and
   a sealing member configured to seal a connection portion between the flow passage holes in the two fluid devices on a radially inner side of the union nut when the first internal thread portion is screwed to the first external thread portion and the second internal thread portion is screwed to the second external thread portion, wherein
   each of the first external thread portion and the first internal thread portion is one of a right-hand thread and a left-hand thread,
   each of the second external thread portion and the second internal thread portion is the other of the right-hand thread and the left-hand thread,
   a thread start position of the first external thread portion and a thread start position of the second external thread portion are set at a same position in a circumferential direction, and
   a thread start position of the first internal thread portion and a thread start position of the second internal thread portion are set at a same position in the circumferential direction,
   the flow passage joint structure comprising:
      a first mark portion provided to the one fluid device and indicating a position shifted, in a direction opposite to a tightening direction of the union nut by a first predetermined angle, from the thread start position of the first external thread portion;
      a second mark portion provided to the other fluid device and indicating a position shifted, in the direction opposite to the tightening direction of the union nut by a second predetermined angle, from the thread start position of the second external thread portion; and
      a third mark portion provided to the union nut and indicating at least one of the thread start position of the first internal thread portion and the thread start position of the second internal thread portion.

7. The flow passage joint structure according to claim 6, wherein the union nut further has a non-threaded portion formed between the first internal thread portion and the second internal thread portion.

8. The flow passage joint structure according to claim 6, wherein at least one of the two fluid devices has a contact portion with which the union nut comes into contact when retightening of the union nut reaches a limit thereof.

9. The flow passage joint structure according to claim 6, further comprising a flow direction mark portion provided to the union nut and indicating a flow direction of a fluid flowing in the union nut.

10. The flow passage joint structure according to claim 6, further comprising a tightening direction mark portion provided to the union nut and indicating a tightening direction of the union nut.

\* \* \* \* \*